Patented May 17, 1932

1,859,203

UNITED STATES PATENT OFFICE

HENRY COOK GARDINER, OF ANACONDA, MONTANA, ASSIGNOR TO ANACONDA COPPER MINING CO., OF ANACONDA, MONTANA, A CORPORATION OF MONTANA

METHOD AND PRODUCT FOR PRESERVING TIMBER

No Drawing. Application filed January 12, 1929. Serial No. 332,233.

This invention relates to a method and a product for preserving timbers.

An object of the invention is the provision of a product which may be applied in the form of a paste to timbers, such as telegraph or telephone poles, fence posts, and the like, in which the ends are buried in the ground or are in contact with the soil, the paste including a fungicide which will prevent rotting or other analogous destruction of the wood.

Another object of the invention is the provision of a method for the effectual, gradual and progressive impregnation and preservation of poles, post, timber and the like that have been placed in contact with the ground.

Still another feature of the invention is the provision of a paste containing as one of the important fungicides, pulverulent white arsenic, $As_2O_3$ in connection with organic or inorganic chemical compounds of copper, lead, zinc, antimony, iron, calcium, flourine, and sodium in varying proportions, it being not essential that all of the last-mentioned elements should be included in the paste for all purposes.

A further object of the invention is the provision of a paste which may be readily applied in any approved manner to a timber to protect the same against rot or decay, the paste containing a quantity of solid arsenic-containing materials either by themselves or in combination with other preservatives or re-active materials, or both, such as solid chemical compounds or mixtures, organic or inorganic, the paste being applied to that portion of the timber which is inserted in the ground and forming a coating for not only impregnating the fibers of the timber but for partially saturating the adjacent soil in order to sterilize both the timber and the ground.

A still further object of the invention is the provision of a paste containing an arsenic compound and other preservative compounds, the solubility of such compound being controlled by other ingredients which either attract moisture or by chemical reaction, form soluble or partially soluble chemical compounds.

As the main constituent of this preservative and antiseptic compound there may be employed either arsenious or arsenic acid or compounds of arsenic such as the arsenates and arsenites of copper, zinc, lead and sodium; arsenious and arsenic fluorides, arsenic phosphide, and in general any organic or inorganic compounds of arsenic or mixtures containing arsenic.

In order to facilitate and hasten chemical reaction or to increase the solubility of the compounds of arsenic any one or more of the soluble chemical compounds or mixtures thereof may be added, arsenic pentoxide, sodium hydroxide, sodium carbonate, magnesium chloride, glycerine, sulphuric acid, hydrochloric acid, nitric acid, sodium chloride and phosphoric acid.

This invention will be best understood from a consideration of the following detailed description forming a part of the specification, nevertheless, it is to be understood that the invention is not confined to the disclosure, being susceptible of such changes and modifications which shall define no material departure from the salient features of the invention as expressed in the appended claims.

In carrying out my invention I first select materials which it is intended to employ for forming a paste and these materials are thoroughly incorporated in from 15% to 50% of water in a pug mill.

The following examples are illustrative of preserving and sterilizing materials suitable for use in connection with my invention:

(1) Pulverulent white arsenic; $As_2O_3$, 90% to 100%.

(2) Sample analysis, $As_2O_3$, 60% to 99%, organic or inorganic chemical compounds of copper, lead, zinc, antimony, iron, calcium and sodium in varying proportions from 39% to 1%.

(3) Sample analysis $As_2O_3$, 30% to 60%; organic or inorganic chemical compounds of copper, lead, zinc, antimony, iron, calcium and sodium in varying proportions from 69% to 39%.

(4) Sample analysis $As_2O_3$, 5% to 30%, organic or inorganic chemical compounds of copper, lead, zinc, antimony, iron, calcium and sodium in varying proportions from 94% to 69%.

(5)—(1), (2), (3) or (4) with an addition of 1 to 10% by weight of a chemical compound such as sodium chloride, magnesium chloride, calcium chloride, mono-calcium phosphate or other deliquescent chemical compounds for purposes of increasing the solubility by attracting moisture.

(6)—(1), (2), (3) or (4) with an addition of 1 to 10% by weight of a chemical compound such as sodium carbonate or bicarbonate or magnesium chloride or other chemical compounds for the purpose of increasing the solubility of the mixture.

The arsenic component of the compositions may be supplied in the form of a pure white arsenic or in the form of a crude and impure arsenic-containing material such as is produced in metallurgical smelting practice. The arsenic content of such material may run from say 10 to 95%. The following is a sample analysis showing the percentages of the principal ingredients of a suitable arsenic-containing material:

| | Per cent |
|---|---|
| Arsenic trioxide | 75.2 |
| Copper sulfate | 2.2 |
| Silica | 3.1 |
| Lead arsenate | 3.3 |
| Ferric oxide | 2.6 |
| Aluminum oxide | 1.4 |
| Calcium oxide | 3.2 |
| Lead compounds | 2.4 | and water, zinc oxide, bismuth oxide, selenium oxide, telluric oxide, sulphur, and antimony oxide in quantities less than 1%. It is, of course, to be understood that the materials may contain the various elements in chemical combinations other than those listed in the chemical analysis. Such crude arsenic-containing materials containing mixtures of a variety of elements and compounds have been found to be particularly effective wood-preservative agents when applied in accordance with my invention and are moreover very inexpensive.

Preference is given, however, to the dust resulting from the metallurgical reduction of ores which contain arsenic. This dust is mixed with approximately 15 to 50% of water which is thoroughly incorporated in the dust to provide a paste. This paste is applied to those portions of the timbers which are inserted in the ground or which come in contact with the soil to provide a ring or coating of material.

The paste so formed is of a grayish color and has sufficient adhesive qualities that it will remain positioned when applied by either a brush or trowel to either new or to timbers which have been previously attacked by fungi.

In those regions of limited rainfall not only a large proportion of water is employed but chemical compounds are mixed with the paste in order to increase the solubility and such compounds include sodium hydroxide, sodium carbonate, sulphuric acid, hydrochloric acid, nitric acid, sodium chloride, magnesium chloride, phosphoric acid and glycerine.

The efficacy of the paste lies in the initial impetus given to the saturation of the timbers by the toxic compounds taken up by the moisture in the paste. This is due to the fact that the moisture is held in close contact with the wood while the paste fills in interstices in the timbers and provides a solid mass about the exterior of said timbers.

It has been found that by the use of such a paste applied as a coating to timbers moisture will be retained in the paste for considerable periods and such moisture will be supplemented by soil moisture.

In arid regions the additional reactive material or chemical compounds or mixtures should be of such character as to absorb moisture. In less arid regions the moisture already in the soil may be sufficient to slowly dissolve any soluble ingredients, while the other added materials will assist in rendering soluble such arsenic compounds as are insoluble or difficultly soluble, or in forming, in the presence of moisture, arsenic compounds which are sufficiently soluble.

I am aware that arsenic compounds have been used to impregnate wood, such methods requiring heating and drying and introduction into the pores of the wood of the arsenical compounds. My method does not require any such separate impregnation, and is applicable to the untreated poles or the like such as are ordinarily used.

While I have, in the claims, specifically referred to arsenic-containing compounds, other compounds or metals such as lead, zinc, copper, fluorine, antimony, calcium, iron or sodium act or may act as equivalents, and are included in the scope of my invention.

In treating old poles the decayed portions or infected portions are removed and the paste is applied or filled into the interstices formed by the removal of the decayed wood. The soil is carefully packed around the paste and wood. Where the paste is to be applied to new poles, rings or sleeves of the paste are spread on the surface to a predetermined thickness and where such action warrants the entire portion of the pole which is placed underground may be covered with the paste. In other cases sleeves or rings of the paste may be placed in different locations around the pole or at base of pole.

I claim:

1. A toxic coating for timbers in contact with the ground and for conserving a definite quantity of moisture which will act as a vehicle for gradually impregnating the fibers of the timber with a toxic compound comprising a covering formed of a paste composed of an intimate mixture of water and dust resulting from the metallurgical reduction of arsenic-bearing ores, the wet paste acting as a storage and distributing agent for the soluble toxic ingredients, the wet paste including a hygroscopic substance selected from the group consisting of calcium chloride, sodium hydroxide, sodium carbonate, sulphuric acid, hydrochloric acid, nitric acid, sodium chloride, magnesium chloride, phosphoric acid and glycerine.

2. A toxic coating for timber in contact with the ground comprising an intimate mixture of water and a dust resulting from the metallurgical reduction of arsenic-bearing ores and containing a predetermined quantity of arsenic trioxide, said mixture forming a paste, the water saturated dust acting as a medium for retaining the moisture in the paste while the moisture acts as a vehicle for impregnating the fibers of the timbers with soluble toxic substances in the paste, and a hygroscopic substance for aiding in retaining moisture in the toxic substance, the wet paste including the hygroscopic substance acting as a reservoir and distributing agent for the soluble toxic ingredients over a long period of time.

HENRY COOK GARDINER.